United States Patent
Joseph et al.

(10) Patent No.: US 12,442,932 B2
(45) Date of Patent: Oct. 14, 2025

(54) SYSTEM FOR LOCAL AREA DETECTION AND ALERTING OF GLOBAL NAVIGATION SATELLITE SYSTEM (GNSS) SPOOFING

(71) Applicant: Rockwell Collins, Inc., Cedar Rapids, IA (US)

(72) Inventors: Angelo J. Joseph, Melbourne, FL (US); Robert J. Frank, Indialantic, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 403 days.

(21) Appl. No.: 18/122,531

(22) Filed: Mar. 16, 2023

(65) Prior Publication Data

US 2024/0019581 A1    Jan. 18, 2024

Related U.S. Application Data

(60) Provisional application No. 63/388,327, filed on Jul. 12, 2022.

(51) Int. Cl.
*G01S 19/21* (2010.01)
*G05D 1/00* (2024.01)

(52) U.S. Cl.
CPC ............ *G01S 19/215* (2013.01); *G05D 1/042* (2013.01)

(58) Field of Classification Search
CPC ....... G01S 19/215; G01S 19/20; G05D 1/042; H04K 3/255; H04K 3/65; H04K 3/90
USPC ...................................... 455/456.1
See application file for complete search history.

(56) References Cited

U.S. PATENT DOCUMENTS

| | | | |
|---|---|---|---|
| 5,627,546 A * | 5/1997 | Crow ...................... | G08G 5/56 342/353 |
| 5,786,773 A | 7/1998 | Murphy | |
| 7,764,224 B1 * | 7/2010 | Anderson ............. | G01S 19/215 342/357.27 |

(Continued)

FOREIGN PATENT DOCUMENTS

| WO | WO-2019239764 A1 * | 12/2019 | ............. G01S 19/22 |
|---|---|---|---|
| WO | WO-2022015873 A2 * | 1/2022 | ............. G01S 19/06 |

(Continued)

OTHER PUBLICATIONS

Extended European Search Report dated Dec. 20, 2023; European Application No. 23183124.9.

*Primary Examiner* — Mahendra R Patel
(74) *Attorney, Agent, or Firm* — Suiter Swantz IP (57) ABSTRACT

A local area detection and alerting system (LDAS) for detecting potential GNSS spoofing within a protected airspace includes a ground-based control station and several RF interference (RFI) control stations spaced to define the protected airspace. Each RFI control station includes two or more reference GNSS signal receivers in communication with two or more reception (Rx) antennas, each antenna having a surveyed true location and distinct height. The reference receivers continually determine GNSS-derived absolute positions of each antenna, which are compared to their true locations to determine if GNSS spoofing is responsible for measurement anomalies. Any detection of potential spoofing is forwarded to the control station, which broadcasts regular LDAS updates indicating the presence or absence of potential spoofing to all aircraft operating within a transmission range surrounding the protected airspace.

20 Claims, 7 Drawing Sheets

(56) References Cited

U.S. PATENT DOCUMENTS

| | | | | |
|---|---|---|---|---|
| 8,611,922 | B2* | 12/2013 | Wigren | G01S 5/0045 |
| | | | | 455/457 |
| 9,107,178 | B2 | 8/2015 | Sydir et al. | |
| 9,466,881 | B1* | 10/2016 | Berry | G01C 21/20 |
| 9,594,149 | B2* | 3/2017 | Siomina | G01S 5/02524 |
| 9,609,615 | B2 | 3/2017 | Jung | |
| 9,689,686 | B1 | 6/2017 | Carmack et al. | |
| 9,725,171 | B1 | 8/2017 | Carmack et al. | |
| 9,847,033 | B1 | 12/2017 | Carmack et al. | |
| 9,952,326 | B2 | 4/2018 | Mcdonald et al. | |
| 10,466,700 | B1* | 11/2019 | Carmack | G05D 1/101 |
| 10,564,291 | B1* | 2/2020 | McGregor | G01S 19/36 |
| 10,615,831 | B1* | 4/2020 | Moore | H04B 7/18506 |
| 10,775,510 | B2* | 9/2020 | Agee | G01S 19/215 |
| 10,979,876 | B2* | 4/2021 | Alexander | H04W 4/029 |
| 11,026,242 | B2 | 6/2021 | Wigren et al. | |
| 11,194,053 | B1* | 12/2021 | Johnston | G01S 19/37 |
| 11,313,974 | B2 | 4/2022 | Savoy, Jr. et al. | |
| 2013/0069815 | A1* | 3/2013 | Smith | G08G 5/80 |
| | | | | 342/463 |
| 2014/0062781 | A1* | 3/2014 | Mathews | G01S 19/11 |
| | | | | 342/357.64 |
| 2015/0234053 | A1* | 8/2015 | Psiaki | H04K 3/90 |
| | | | | 342/357.51 |
| 2018/0372879 | A1* | 12/2018 | Whitehead | G01S 19/215 |
| 2019/0179031 | A1* | 6/2019 | Broumandan | G01S 19/47 |
| 2021/0149058 | A1* | 5/2021 | Lavi | G01S 19/21 |
| 2021/0333411 | A1* | 10/2021 | Gum | G01S 19/21 |
| 2021/0405213 | A1* | 12/2021 | Tuck | G01S 19/49 |
| 2022/0021702 | A1* | 1/2022 | Bouthemy | H04L 63/1483 |
| 2022/0035044 | A1* | 2/2022 | Cookman | G01S 19/42 |
| 2022/0066044 | A1 | 3/2022 | McDonald et al. | |
| 2022/0317312 | A1* | 10/2022 | Sharma | H04W 4/40 |
| 2022/0397682 | A1* | 12/2022 | Saunders | G01S 19/06 |
| 2024/0219577 | A1* | 7/2024 | Averin | G01S 19/43 |

FOREIGN PATENT DOCUMENTS

| | | | | |
|---|---|---|---|---|
| WO | WO-2022084401 | A2 * | 4/2022 | G01S 19/215 |
| WO | WO-2023223070 | A1 * | 11/2023 | G01S 1/24 |

* cited by examiner

518 — Selecting, via the control station, two or more active receiver stations from the plurality of reference receiver stations for a second time interval, the unselected receiver stations designated as inactive receiver stations 520 — When the second time interval expires, selecting, via the control station, a new group of two or more active receiver stations from the plurality of receiver stations

*FIG. 5C*

SYSTEM FOR LOCAL AREA DETECTION AND ALERTING OF GLOBAL NAVIGATION SATELLITE SYSTEM (GNSS) SPOOFING

CROSS-REFERENCE TO RELATED APPLICATIONS

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

RELATED APPLICATIONS

U.S. Provisional Patent Application No. 63/388,327 filed Jul. 12, 2022 relating to SYSTEM FOR LOCAL AREA DETECTION AND ALERTING OF GLOBAL NAVIGATION SATELLITE SYSTEM (GNSS) SPOOFING; and U.S. patent application Ser. No. 18/122,546 and relating to SYSTEM AND METHOD FOR RADIO FREQUENCY FINGERPRINT PROFILE GENERATION VIA AIRBORNE RADIOS.

Said U.S. Patent Application 63/388,327 and Ser. No. 18/122,546 are herein incorporated by reference in their entirety.

BACKGROUND

Global navigation satellite systems (GNSS; e.g., GPS, GLONASS, BeiDou, Galileo, IRNSS/NavIC, QZSS) provide critical navigation and landing services for all classes of aircraft. Aircraft on approach to a landing at an airport runway particularly require the precision accuracy and trustworthy integrity of GNSS-driven positioning to utilize enhanced navigation and landing tools, e.g., Localizer Performance with Vertical Guidance (LPV, LPG), Required Navigation Performance (RNP, RPG), Ground Based Augmentation System (GBAS, including GBAS Landing System (GLS)). However, aircraft operations may be inconvenienced or threatened by the increasing presence of military or commercial jammers and spoofers. For example, jammers and spoofers may drive interference or errors into the GNSS system. Aircraft, in turn, must account for these attacks on system integrity when computing protection bounds for their position outputs (in addition to other threats, e.g., satellite failures, atmospheric anomalies, multipath errors). Further, there are currently no available models for predicting prior probability of spoofer/jammer presence within a given airspace. The conservative approach, then, is to assume that spoofers and jammers are always present, and inflate protection levels accordingly. However, higher protection levels reduce the availability of, or may preclude entirely, navigational and landing operations as described above.

SUMMARY

In a first aspect, a system for local area and detection of global navigation satellite system (GNSS) spoofing (LDAS) is disclosed. In embodiments, the LDAS system includes one or more receiver stations and a master control station defining a protected airspace around an airport or other like target. The control station includes a transmitter antenna (Tx) disposed at a height defining a line of sight (LOS) transmission range extending beyond the range of the protected airspace. Each receiver station includes at least two GNSS signal receivers connected to at least two receiving (Rx) antennas, each Rx antenna having a surveyed true location and a height distinct from all other Rx antennas at that receiver station. Each GNSS signal receiver continually determines a GNSS-driven absolute position for each Rx antenna based on positioning signals received from GNSS navigational satellites. The determined absolute positions are compared by each receiver station to the true location of each Rx antenna to determine if positioning anomalies exist and, if so, if said anomalies may be due to potential GNSS spoofing. Any receiver station detecting a nonzero probability of GNSS spoofing reports the nonzero probability to the master control station. The master control station transmits an LDAS update at regular intervals (e.g., via VHF data broadcast (VDB) transmissions otherwise associated with Ground Based Augmentation Services (GBAS) or other like landing and navigation services) to any aircraft within transmission range. For example, aircraft may auto-tune their receivers to a dedicated LDAS frequency when entering transmission range. If a receiver station reports a non-zero probability of GNSS spoofing, the LDAS update will indicate the nonzero probability such that aircraft may adjust GNSS protection levels to allow for heightened threats.

In some embodiments, the LDAS update will indicate a zero probability of GNSS spoofing (e.g., associated with lower aircraft protection levels) if no receiver station has indicated a nonzero probability during the most recent time interval between LDAS update transmissions.

In some embodiments, a receiver station indicates a nonzero probability of GNSS spoofing when absolute positions of an Rx antenna determined by the GNSS signal receivers sufficiently deviate from the true location of the Rx antenna, and the deviations can be attributed to GNSS spoofing (e.g., beyond a confidence bound) as opposed to measurement errors or other anomalies.

In some embodiments, LDAS updates include the confidence bound.

In some embodiments, signal receivers at a receiver station determining a nonzero probability of GNSS spoofer detection attempt to detect a spoofer transmission and, by performing angle of arrival measurements on the spoofer transmission, determine directional information of the spoofer source relative to the receiver station.

In some embodiments, the directional information is forwarded to the master control station and included in VDB transmissions.

In some embodiments, the master control station periodically selects active receiver stations or signal receivers from a pool of receiver stations. Active receiver stations and signal receivers monitor for GNSS spoofing, while inactive receiver stations and signal receivers remain dormant until selected by the master control stations for a future activity interval.

In some embodiments, one or more GNSS signal receivers and/or Rx antennas may be mounted to a tethered aerial vehicle hovering at the true location and at an altitude defining an optimal LOS range for the protected airspace.

In some embodiments, the LDAS system is based at an airport, and the coverage volume of the protected airspace extends for at least a minimum defined radius around the airport.

In some embodiments, the master control station is physically located at the airport.

In a further aspect, a hybrid LDAS control station is disclosed. In embodiments, each LDAS control station includes a single receiver/transmitter and antenna that continually determines its own GNSS-driven absolute position and compares that absolute position to its surveyed true location, determining a nonzero probability of GNSS spoofer detection if the absolute position sufficiently deviates from the true location and the deviation can be attributed to GNSS spoofing with sufficient confidence.

In some embodiments, the receiver/transmitter is mounted atop or to an antenna extending above ground level to extend the LOS range of the control station.

In some embodiments, the receiver/transmitter is attached to a tethered aerial vehicle configured for hovering operations at a target altitude consistent with the true location.

In some embodiments, the LDAS control station is one of a network of LDAS control stations and exchanges with neighboring stations LDAS update messages indicative of a zero or nonzero probability of GNSS spoofer presence proximate to a given control station.

In a further aspect, a method for local area detection and alerting of GNSS spoofing (LDAS) is also disclosed. In embodiments, the method includes receiving, via one or more GNSS signal receivers of a reference receiver station (e.g., RFI control station) of an LDAS system monitoring a protected airspace, each signal receiver connected to at least two receiving (Rx) antennas, each Rx antenna having a distinct height and a surveyed true location, positioning signals from GNSS navigational satellites. The method includes determining, via each GNSS signal receiver, a GNSS-driven absolute position of each Rx antenna based on each set of received positioning signals. The method includes determining a probability of GNSS spoofer presence by comparing, via one or more of the signal receivers, the measured GNSS-driven absolute position of each Rx antenna to its true location. The method includes, if the determined probability of GNSS spoofer presence is nonzero, notifying a master control station of the LDAS system. The method includes transmitting, via a master control station of the LDAS system, a regular LDAS update (e.g., via VHF data broadcast (VDB)), the LDAS update indicating either a zero probability of GNSS spoofer presence or a nonzero probability (e.g., if one or more receiver stations of the LDAS system have determined a nonzero probability since the last LDAS update).

In some embodiments, the method includes determining a nonzero probability of GNSS spoofer presence if 1) GNSS-driven absolute positions of a given Rx antenna sufficiently deviate from its true location and 2) the deviation/s can be attributed to GNSS spoofing with sufficient confidence (e.g., beyond a confidence bound).

In some embodiments, the method includes transmitting the accuracy confidence bound with the zero or nonzero probability of GNSS spoofer presence via VDB transmission.

In some embodiments, the method includes detecting, via the signal receivers, a spoofer transmission associated with a nonzero probability of spoofer presence. The method includes determining angles of arrival of the spoofer transmission via each signal receiver and Rx antenna. The method includes determining, based on the angle of arrival measurements, directional information of the spoofer transmission source relative to the receiver station.

In some embodiments, the method includes transmitting the directional information as a component of a VDB transmission by the master control station.

In some embodiments, the method further includes selecting, via the master control station, two or more active receiver stations (or signal receivers of a given receiver station) from a pool of receiver stations associated with the LDAS system, the non-selected receiver stations remaining inactive. The method includes, when the current monitoring interval expires, selecting a new pool of active receiver stations via the LDAS master control station.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a system and method for monitoring an airspace for potential GNSS spoofers, as well as notifying any aircraft operating in the airspace whether the presence of spoofers may be safely ignored, allowing the aircraft to use standard threat models associated with lower protection levels. The protected airspace may include a line-of-sight (LOS) volume extending far beyond the conventional operating space for GBAS (approximately 23 NM/42 km) to incorporate aircraft scheduled to land at an airport but which have not yet commenced a formal approach procedure (or where GBAS services may not exist). Based on, for example, elevation of GNSS signal receivers and surrounding terrain, the protected airspace may extend 100 NM or farther around an associated airport. For example, any aircraft entering the protected airspace may auto-tune its multi-mode receivers (MMR) to a dedicated VDB frequency and receive regular updates as to the likely presence of spoofers within the protected airspace, monitoring and adjusting their protection levels accordingly.

Figure 1:
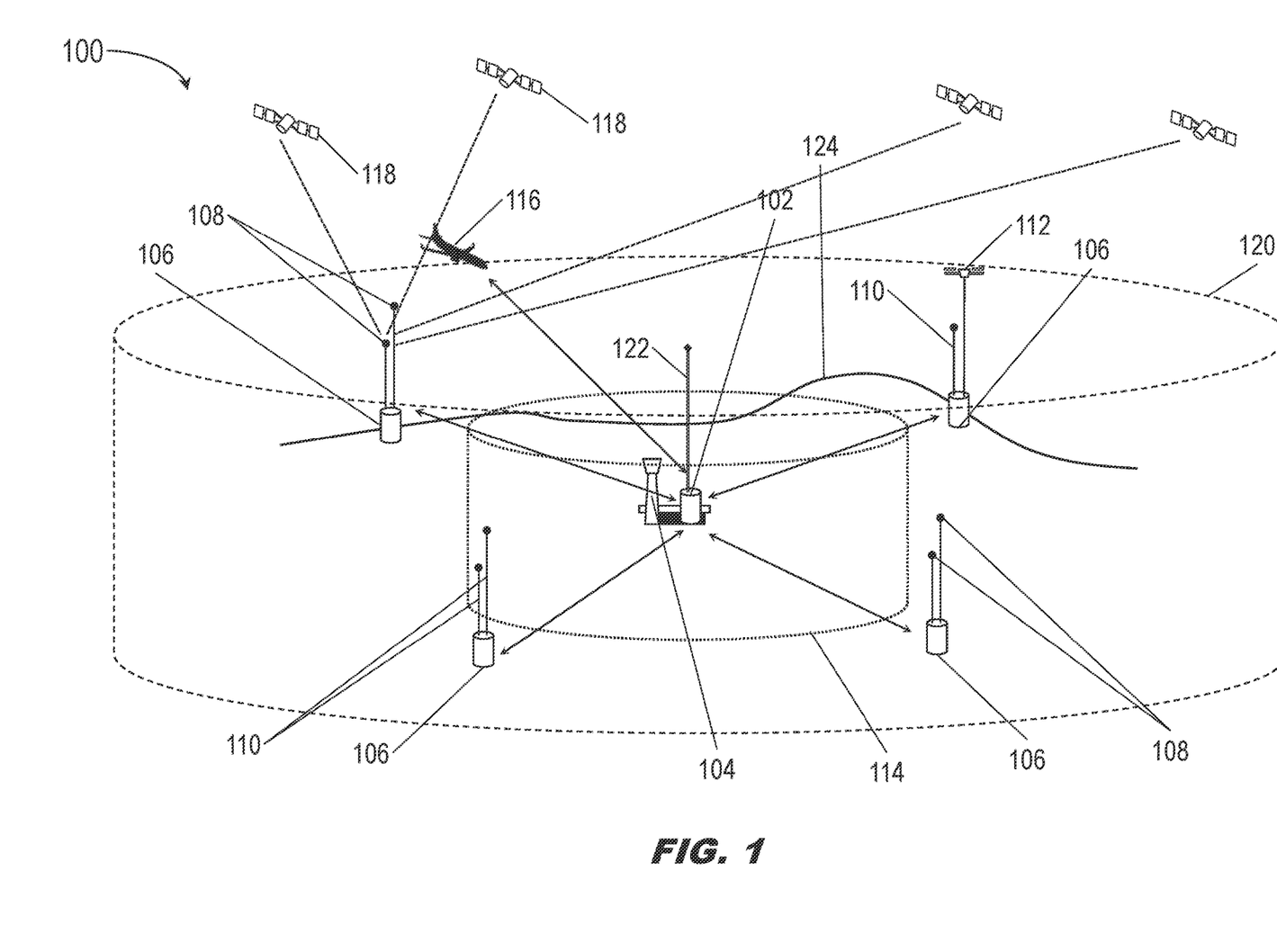
FIG. 1 is a diagrammatic illustration of a local-area detection and alerting of GNSS spoofer (LDAS) system and protected airspace architecture according to example embodiments of this disclosure.

Referring now to FIG. 1, a local-area detection and alerting of global navigation satellite system (GNSS) spoofers (LDAS) system 100 is shown. The LDAS system 100 may include a master control station 102 (e.g., which may be embodied at or near an airport 104 or other point of interest) and auxiliary radio frequency interference (RFI) control stations 106. Each RFI control station 106 may include reference GNSS signal receivers 108, e.g., mounted to elevated receiving (Rx) antennas 110 or other elevated structures, or to tethered drones 112 (partially or fully autonomous unmanned aerial vehicles (UAV)).

In embodiments, the LDAS system 100 may establish and maintain a protection region 114 (e.g., protected airspace, coverage volume) surrounding the airport 104, master control station 102, or other point of interest. For example, the protection region 114 may comprise an airspace surrounding the airport 104 to at least a defined radius or defined boundaries, e.g., 100 or 200 miles, and to a defined altitude.

In embodiments, the precise size of the protection region 114 may at least partially depend on fixed and dynamic factors, e.g., terrain conditions (natural and/or manmade obstacles) or atmospheric conditions (wind, weather, precipitation) in the vicinity of the airport 104. Similarly, the effective size of the protection region 114 may be defined by visual line of sight (LOS, VLOS) relative to one or more of the elevated GNSS signal receivers 108. For example, the higher the elevated Rx antennas 110, the greater their LOS range and, broadly speaking, the greater the range of the LDAS system 100 (which may also be based on, e.g., the strength of the elevated GNSS signal receivers 108).

In embodiments, under ideal atmospheric conditions the practical size of the protection region 114 (equivalent to the effective range of the LDAS system 100) may extend farther than its defined radius; however, the defined radius may serve to aircraft 116 (e.g., air traffic whose flight plans terminate at the airport 104 or traverse the protection region) as an assurance of LDAS system 100 performance within its defined bounds, e.g., a minimum region of assured protection.

In embodiments, the effective size of the protection region 114 may extend beyond standard approach patterns for aircraft 116 intending to land at the airport 104; similarly, the effective range of the LDAS system 100 may extend beyond that of landing and navigation aids associated with approach and landing procedures associated with the airport. For example, Ground Based Augmentation System (GBAS) services may be available to local-area aircraft 116 substantially within a ~23 NM coverage of the airport 104, in order to provide navigational support (e.g., corrections to position errors associated with GNSS or other like navigational satellites 118) as the aircraft transition from en-route airspace (e.g., cruise or initial descent segments) into approach and landing procedures. In embodiments, the LDAS system 100 may extend the protection region 114 beyond the effective coverage area of GBAS services (based, for example, on LOS range provided by the height of the elevated Rx antennas 110). Alternatively, the LDAS system 100 may provide a protection region 114 in areas where GBAS services are unavailable and for which no formal approach procedures are necessary. Further, in some embodiments the master control station 102 may provide regular updates as to the likely presence or absence of GNSS spoofers within the protection region 114 throughout an even larger transmission region 120 extending beyond the protection region. For example, the transmission region 120 may be at least partially defined by a LOS range of a transmitting (Tx) antenna 122 of the master control station 102. Any aircraft 116 entering the transmission region 120 may be able to auto-tune its multi-mode receivers (MMR) to a dedicated frequency for regular updates as to the likely presence or absence of GNSS spoofers within the protection region 114, as described in greater detail below.

In some embodiments, the LDAS system 100 may not maintain a separate master control station 102 at or near the airport 104 or site of interest, but may designate an RFI control station 106 (e.g., sufficiently configured for VHF data broadcast (VDB) transmission as discussed below) as the master control station. Similarly, in some embodiments the LDAS system 100 may maintain a master control station 102 not disposed at or near the airport 104 or site of interest; for example, a master control station 102 may be remotely located from, but in communicative control of, multiple implementations of the LDAS system 100.

In embodiments, the effective size of the protection region 114 and the effective range of the LDAS system 100 may be determined in part by the placement of each RFI control station 106. For example, each RFI control station 106 may include one or more elevated GNSS signal receivers 108, each GNSS signal receiver coupled to two or more Rx antennas 110. In embodiments, each Rx antenna 110 may be associated with a fixed and precision surveyed true location, e.g., stored to memory and/or known to control processors associated with the RFI control station 106, to each GNSS signal receiver 108 of the control center, and/or to the master control station 102. For example, the true location of an Rx antenna 110 may correspond to latitude, longitude, and altitude of antenna elements via which positioning signals are received from constellations of GNSS navigational satellites 118. The true location of each Rx antenna 110 may include an altitude or height distinct from every other Rx antenna at a given RFI control station 106.

In embodiments, each GNSS signal receiver 108 may continually determine an absolute position of each Rx antenna 110 to which the receiver is connected, based on a set of positioning signals received via the set of antenna elements corresponding to each Rx antenna. Each GNSS signal receiver 108 may compare the determined absolute position of each Rx antenna 110 to the true location of that Rx antenna. If, for example, the determined absolute positions of all Rx antennas 110 correspond to their true locations within an accuracy confidence bound (e.g., 99.999% or $10^{-4}$), and the determined absolute positions are free of measurement errors or other anomalies affecting measurement accuracy, the GNSS signal receivers at that RFI control stations may determine the current probability of GNSS spoofer presence to be substantially zero. In embodiments, the RFI control station 106 may notify the master control station 102 of the zero probability.

In embodiments, one or more GNSS-driven absolute positions of an Rx antenna 110 determined by a GNSS signal receiver 108 may deviate from the true location of the Rx antenna, which may or may not be attributable to GNSS spoofing. For example, the GNSS signal receiver may incorporate one or more measurement consistency checks in an attempt to determine, to a sufficient level of confidence (e.g., beyond a predetermined confidence bound), that deviations of determined absolute position from true location are caused by GNSS spoofing as opposed to measurement errors or anomalies. If multiple determinations by a GNSS signal receiver 108 of an absolute position of an Rx antenna 110 are deviant but mutually consistent, this may increase the confidence level that the deviations are caused by GNSS spoofing rather than measurement error. In embodiments, the GNSS signal receiver 108 or RFI control station 106 may report to the master control station 102 deviations of determined absolute positions of an Rx antenna 110 from the true location of the Rx antenna, but may not be able to determine with sufficient confidence that GNSS spoofing is present. Alternatively, measurement consistency checks may establish to at least the predetermined confidence bound that deviations are due to GNSS spoofing, and the GNSS signal receiver 108 may indicate a nonzero probability of spoofer presence.

In embodiments, if an RFI control station 106 reports a nonzero probability of GNSS spoofing, the master control station 102 or RFI control station 106 may alert any aircraft 116 operating within the transmission region 120 (and having auto-tuned to the appropriate VDB frequency) to the potential presence of snoopers or jammers within the protection region 114, so the aircraft may adjust GNSS protection levels accordingly. For example, if a nonzero probability of GNSS spoofing associated with a particular RFI control station 106 persists for a sufficient duration, or if multiple RFI control stations report a nonzero probability of spoofing, the master control station 102 may determine that spoofers or jammers are present. In embodiments, the master control station 102 may transmit LDAS or spoofer detection updates (e.g., via VDB transmissions through the Tx antenna 122, as described below) continually at regular time intervals. If, for example, no RFI control station 106 reports a nonzero probability of GNSS spoofing during the time interval between LDAS update transmissions, the next transmission may note a zero probability of GNSS spoofing presence. For example, the VDB transmission may indicate (e.g., via appropriate VDB coding as described below) that no significant deviations were reported, or that deviations may have been detected but could not with sufficient confidence be attributed to GNSS spoofing. Alternatively, if one or more RFI control stations 106 reports a nonzero probability of GNSS spoofing during the time interval, the next transmission may note the nonzero probability of spoofing. In some embodiments, regular transmissions by the master control station 102 may include additional information, e.g., the confidence bound used for measurement consistency. Accordingly, aircraft 116 operating within the protection region 114 may elect to adjust GNSS protection levels (e.g., consistent with models not accounting for the presence of spoofers) to facilitate use of landing and/or navigational aids in conjunction with approach and landing procedures.

In some embodiments, the master control station 102 and/or RFI control station 106 may alert aircraft 116 operating within the protection region 114 with regular LDAS updates transmitted via GBAS messaging infrastructure. For example, GBAS services (where available) may communicate with aircraft 116 via VHF data broadcast (VDB) transmitters at assigned frequencies or channels within the VHF band (e.g., 108.025-117.950 MHz for GBAS messages). GBAS transmissions may include various message types differentiated by a message identifier; for example, of 255 possible GBAS message identifiers, types 1-5 are associated with specific message types. In embodiments, the LDAS system 100 may provide LDAS updates to aircraft 116 via unused GBAS message types (e.g., a first message type indicative of spoofers present, a second message type indicative of nominal or all-clear conditions) over assigned unused GBAS frequencies or channels (e.g., including areas where GBAS services may not otherwise be available). For example, the master control station 102 of the LDAS system 100 may be associated with a specific GBAS frequency to which any aircraft 116 may automatically tune their multimode receivers (MMR) when entering the transmission region 120 in order to receive regular LDAS updates.

In embodiments, the effective range of the LDAS system 100 and/or the effective size of the protection region 114 may be increased by elevating the GNSS signal receivers 108 of each RFI control station 106, thereby increasing the LOS/VLOS range of each receiver. For example, the GNSS signal receivers 108 may be mounted atop antennas 110 or other elevated structures extending at least a minimum height above ground, based on the terrain 124 in the vicinity of a given RFI control station 106 (manmade or natural obstacles may obscure the LOS/VLOS range of one or more GNSS signal receivers). In some embodiments, GNSS signal receivers may be disposed aboard tethered drones 112 secured to a fixed structure and configured to hover at a fixed, predetermined altitude consistent with the true location and distinct height of the Rx antenna 110.

In some embodiments, the LDAS system 100 may store to memory (e.g., at the master control station 102 or at one or more RFI control stations 106) indexed records of any potential spoofers or jammers detected by a particular RFI control station (e.g., along with any relevant data such as time of day, atmospheric conditions, air traffic levels, nature of the position deviation, etc.). For example, the LDAS system 100 may advise aircraft 116 operating within the transmission region 120 of a potential spoofer or jammer within the protection region 114 based on historical data that suggest a pattern.

Figure 2:
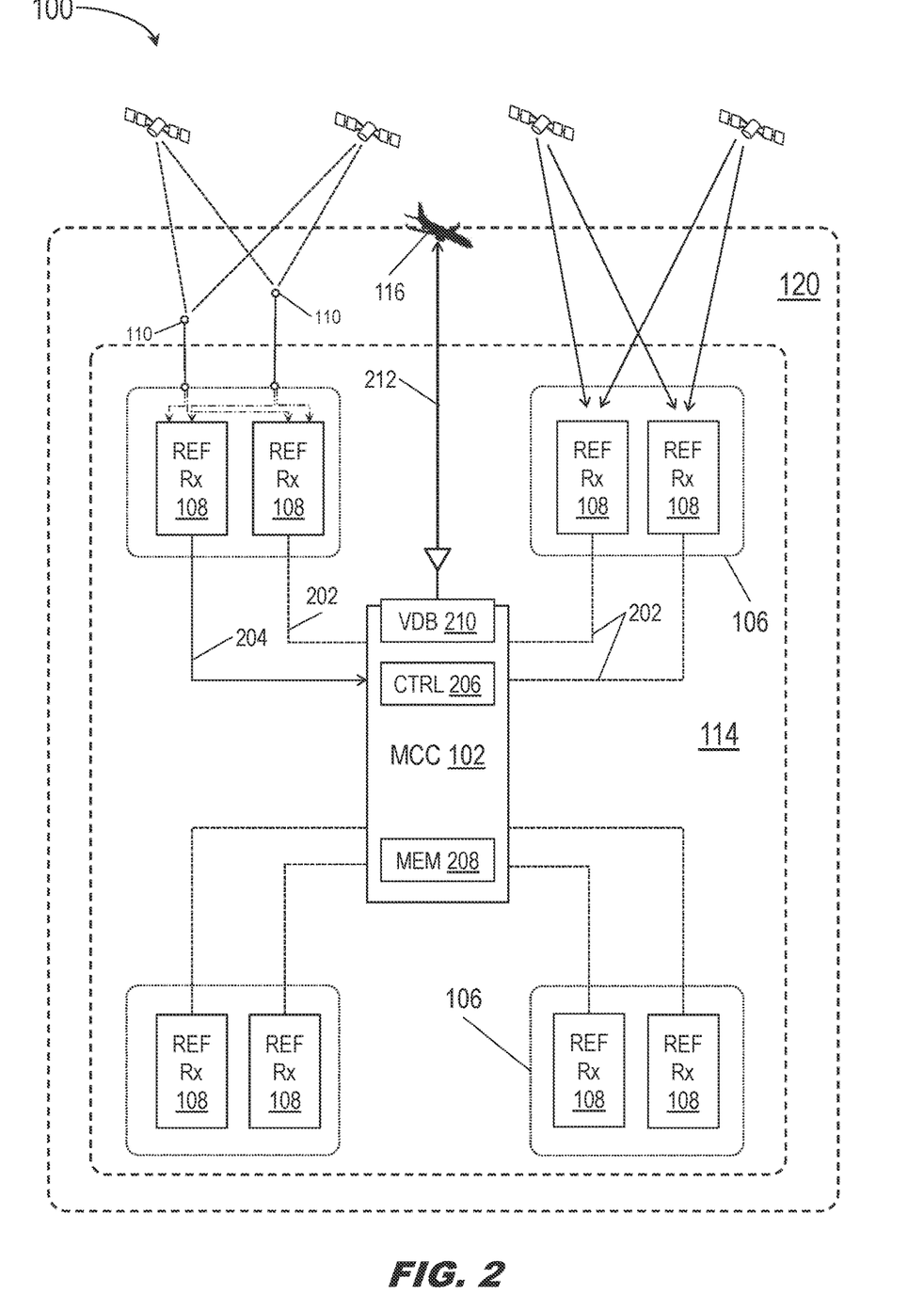
FIG. 2 is a block diagram of the LDAS system/protected airspace architecture of FIG. 1.

Referring now to FIG. 2, the LDAS system 100 is shown.

In embodiments, each RFI control station 106 may include at least two reference GNSS signal receivers 108 each coupled to at least two Rx antennas 110, each Rx antenna corresponding to a surveyed true location. For example, each RFI control station 106 and/or reference GNSS signal receiver 108 may maintain a communications link 202 to the master control station 102, periodically transmitting to the master control station under nominal conditions to indicate that all GNSS signal receivers, as well as GNSS services, associated with that RFI control station 106 are operating normally without threat of spoofing or jamming (e.g., zero probability).

In embodiments, if an RFI control station 106 determines a position deviation, measurement error, GNSS service outage, or nonzero probability of GNSS spoofer/jammer presence within the protection region 114 (e.g., within an effective range of that RFI control station), the RFI control station may promptly transmit an alert message 204 to the master control station 102. For example, an alert message may identify the detecting RFI control station 106, applicable confidence bound/s, and/or any other pertinent data establishing the detected spoofer, e.g., the true location of the receiver, the determined GNSS-driven absolute positions, a date and time, atmospheric conditions, directional information of a detected spoofer transmission (as described below), etc.

In embodiments, the master control station 102 may include control processors 206, memory 208, and VDB transmitter 210. (In some embodiments, one or more RFI control stations 106 may additionally incorporate control processors, memory, and/or VDB transmitter as discussed above). For example, the control processors 206 may analyze each received alert message 204 to verify that the probability of GNSS spoofing presence is nonzero, or that a spoofer has been detected. In embodiments, if the master control station 102 concurs with the determination of a nonzero probability of GNSS spoofing or jamming by the RFI control station 106, the master control station may broadcast an alert 212 (e.g., a regular VDB transmission indicating the nonzero probability of spoofing within the protection region 114, rather than a nominal or zero probability) to any aircraft 116 operating within the transmission region 120 via the VDB transmitter 210 (e.g., at a designated LDAS or GBAS frequency, and via unused GBAS messaging, as described above).

In embodiments, the master control station 102 may index and store to memory 208 all alert (e.g., nonzero probability) messages 204 (and all-clear nominal conditions messages) sent by each reference GNSS signal receiver 108, e.g., for analysis of historical trends or patterns.

Figure 3:
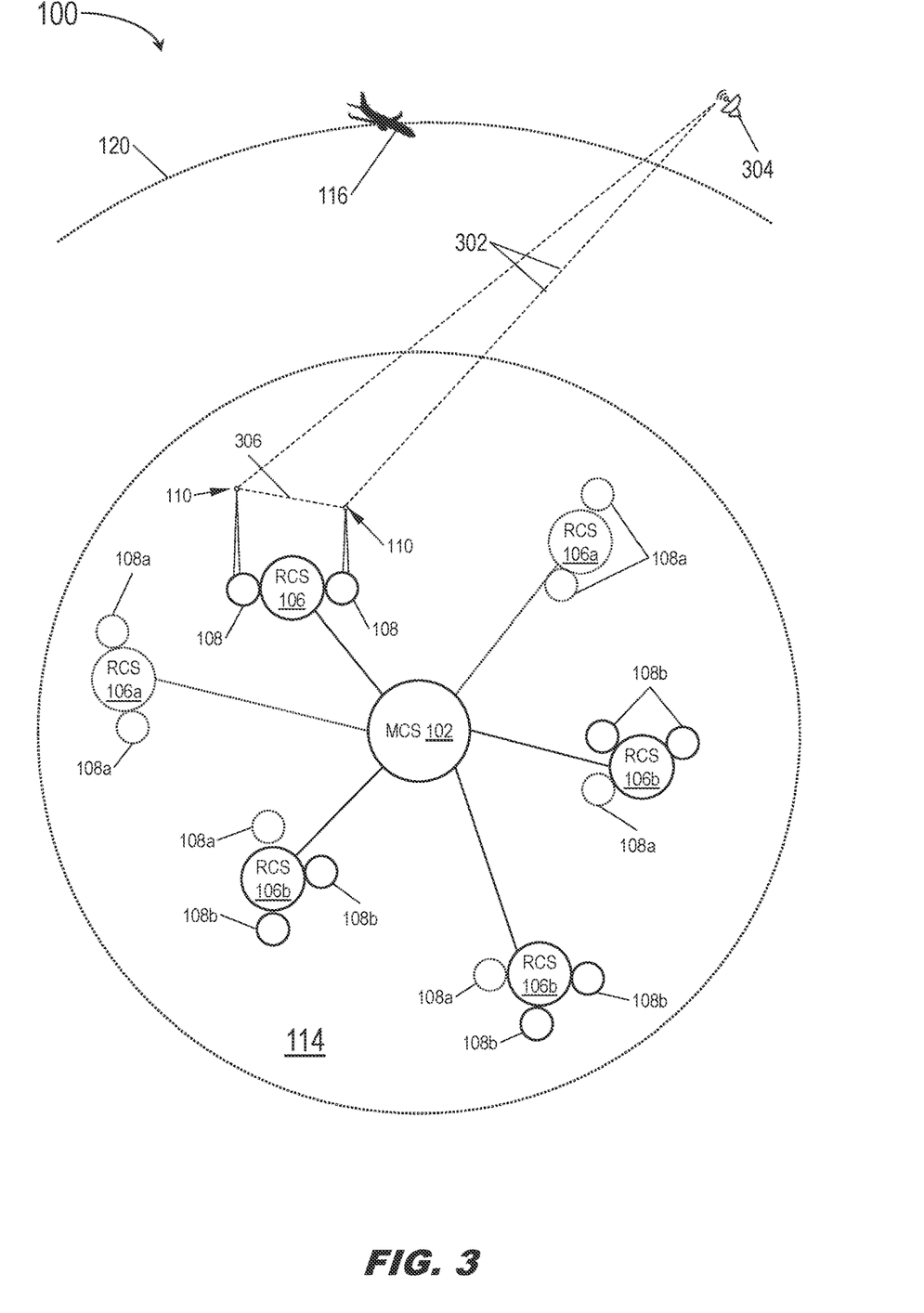
FIG. 3 is a diagrammatic illustration of the LDAS system/protected airspace architecture of FIG. 1 showing active and inactive reference receiver stations.

Referring to FIG. 3, the LDAS system 100 is shown.

In some embodiments, the LDAS system 100 may incorporate multiple RFI control stations 106 but randomly select from the pool of available RFI control stations or GNSS signal receivers 108 a set of active RFI control stations and/or active GNSS signal receivers. For example, the pool of active RFI control stations 106 and/or active GNSS signal receivers 108 may refresh at predetermined or random intervals, e.g., with the master control station 102 selecting a new list of active RFI control stations and/or receivers.

In embodiments, the selection of active RFI control stations 106 and/or active GNSS signal receivers 108 may be randomized so long as the placement of active control stations and/or GNSS signal receivers for any given time window maintains a consistent minimum size of the protection region 114. For example, the RFI control station 106 may be designated a fully active control station, e.g., in that both reference GNSS signal receivers 108 may monitor the protection region 114 during the appointed time window. Similarly, the RFI control station 106a may be designated a fully inactive control stations, e.g., in that all GNSS signal receivers 108a associated with that control station may remain inactive until the next selection. Further, the RFI control stations 106b may be designated partially active control stations, e.g., in that selected GNSS signal receivers 108b may remain active while other GNSS signal receivers 108a may be temporarily inactive until the next selection at least. In embodiments, any partially active RFI control station 106b may maintain at least two active GNSS signal receivers 108b.

In some embodiments, an RFI control station 106 determining a nonzero probability of GNSS spoofing presence may attempt to detect and locate an associated GNSS spoofer transmission 302 and/or its source 304. For example, the GNSS signal receivers 108 and Rx antennas 110 at the RFI control station 106 may perform angle of arrival measurements on a detected spoofer transmission 302 based on, e.g., the distinct heights of each Rx antenna, known angles and distances 306 between the Rx antennas, and variations in arrival times of the spoofer transmission at each Rx antenna. Accordingly, any direction and/or distance information of the spoofer transmission source 304 relative to the Rx antennas 110 and/or the RFI control station 106 may be forwarded to the master control station 102. In embodiments, the master control station 102 may correlate received direction and/or distance information with similar information received from other active RFI control stations 106b (or from other LDAS system networks) to more precisely identify or locate the spoofer transmission source 304. Further, the master control station 102 may include the directional and/or distance information in VDB transmissions indicating the nonzero probability of GNSS spoofer presence.

Figure 4:
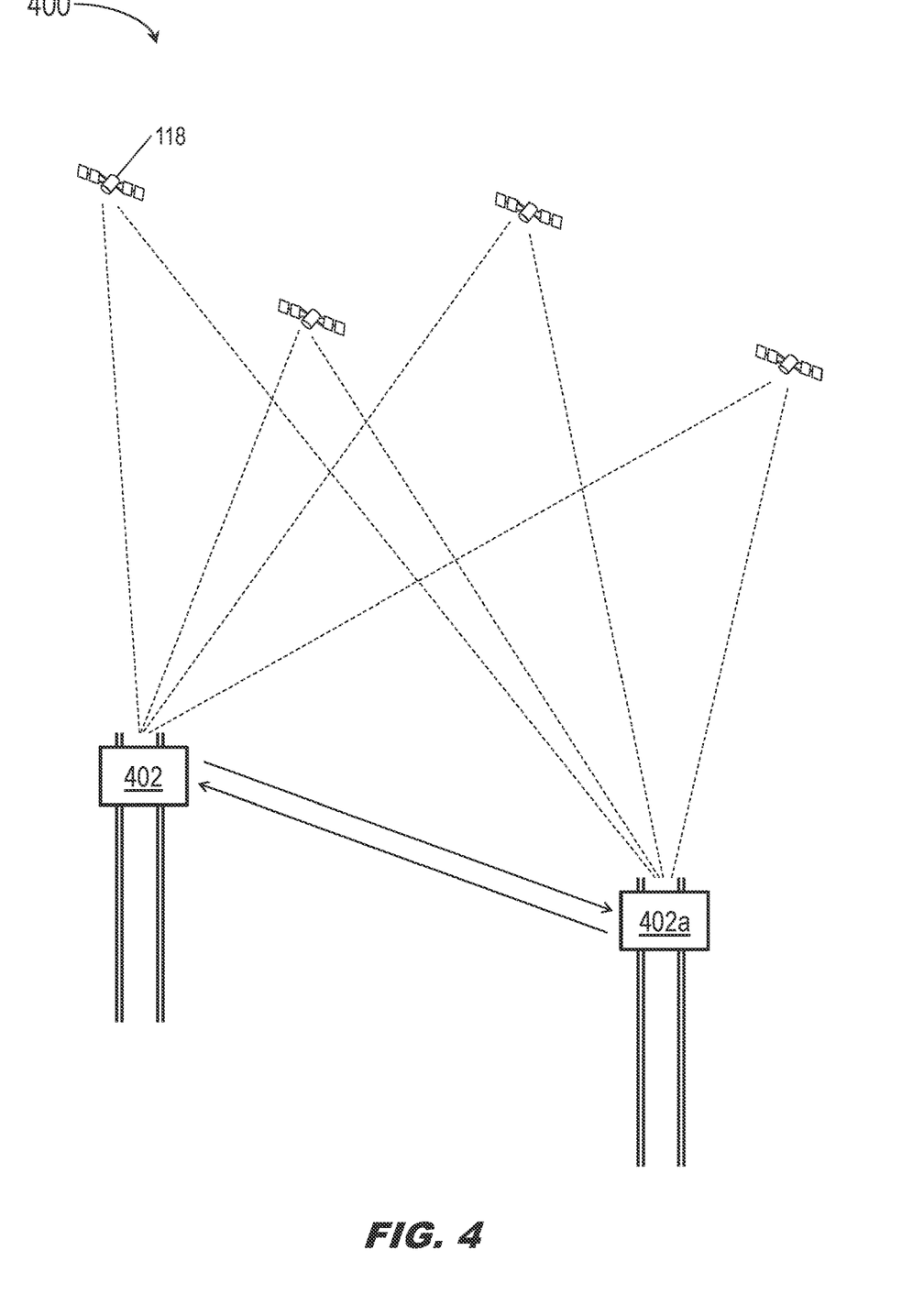
FIG. 4 is a diagrammatic illustration of an embodiment of an LDAS system architecture according to example embodiments of this disclosure.

Referring now to FIG. 4, the LDAS system 400 may be implemented and may function similarly to the LDAS system 100 of FIGS. 1 through 3, except that the LDAS system 400 may incorporate one or more integrated LDAS control stations 402.

In embodiments, each LDAS control station 402 may incorporate a receiver/transmitter having a surveyed true location. For example, the LDAS control station 402 may similarly be mounted to or atop an Rx antenna (110, FIG. 1) at a true location and height above ground. Alternatively, the LDAS control station 402 may be embodied aboard a tethered drone (112, FIG. 1) hovering at a target altitude consistent with a true location.

In embodiments, the LDAS control station 402 may similarly determine its absolute position based on GNSS positioning signals received from navigational satellites 118, comparing the determined absolute position to its true location. If, for example, the absolute position sufficiently deviates from the true location, and the deviation/s can be attributed to GNSS spoofing with sufficient confidence, the LDAS control station 402 may determine a nonzero probability of GNSS spoofer presence and notify other LDAS control stations 402a of the LDAS system 400, e.g., via VDB transmission. In some embodiments, in contrast with multi-receiver, multi-antenna RFI control stations (106, FIG. 1), consistency among a group or series of determined absolute positions that deviate from the true location may serve as a further indicator of GNSS spoofer presence.

In embodiments, the LDAS system 400 may comprise a network of interconnected lower-overhead control stations 402, 402a, each control station combining master control and RFI control functions in a smaller, lighter, more cost-effective package. For example, the control stations 402, 402a of the LDAS system 400 may share information throughout the network and, e.g., with a master control station (102, FIG. 1) that may correlate individual determinations of zero or nonzero probability by individual LDAS control stations 402, 402a to more precisely detect and/or identify GNSS spoofer transmissions (302, FIG. 3) and/or their sources (304, FIG. 3).

Figure 5A:
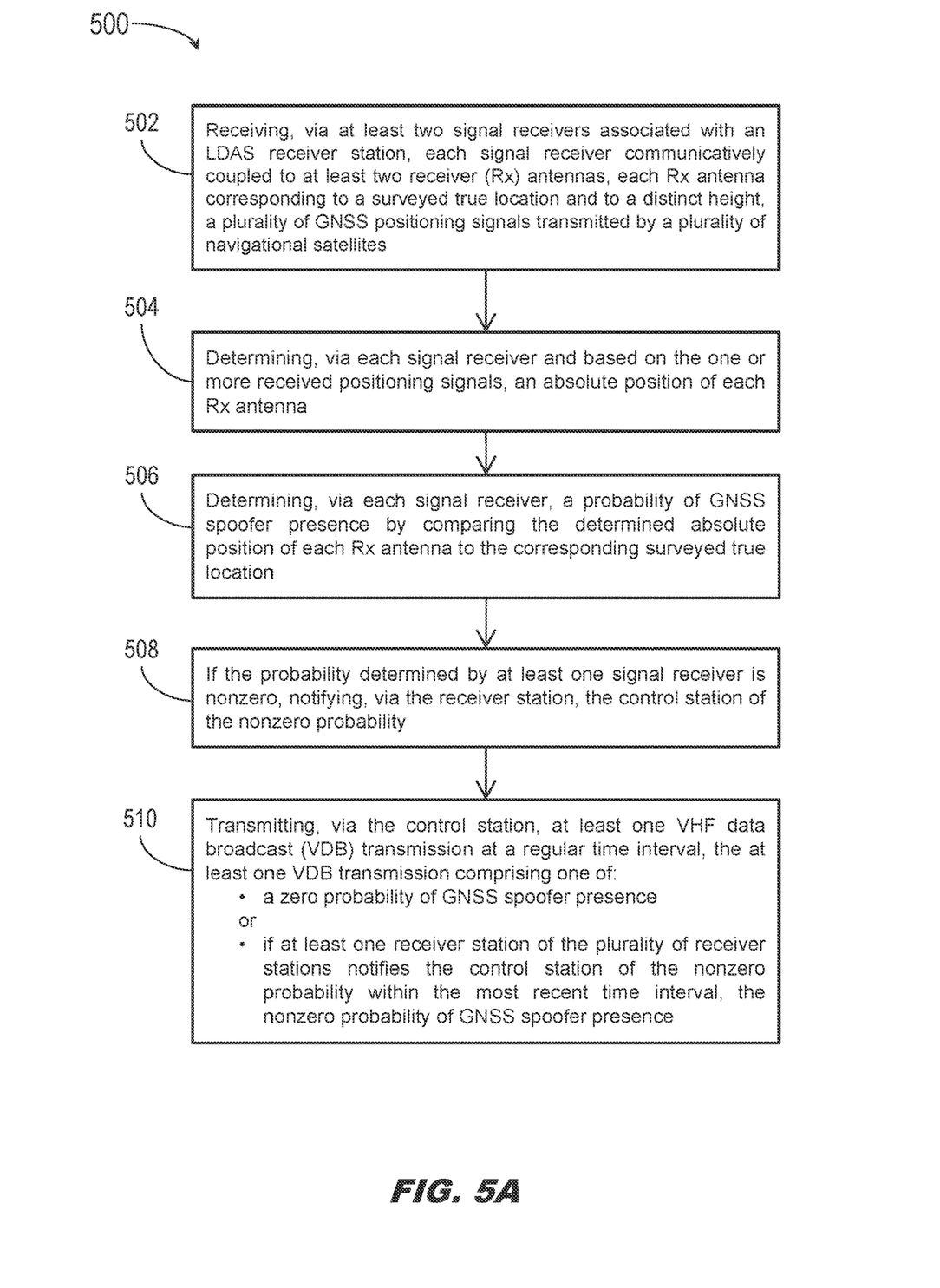
FIGS. 5A through 5C are flow diagrams illustrating a method for local area detection and alerting of potential GNSS spoofing (LDAS) according to example embodiments of this disclosure.

Referring now to FIG. 5A, the method 500 may be implemented by the LDAS system 100 and may include the following steps.

At a step 502, two or more reference GNSS signal receivers of an RFI control station of the LDAS system receive position and timing signals from navigational satellites via two or more Rx antennas in communication with each signal receiver, each Rx antenna having a surveyed true location and a fixed height distinct from all other Rx antennas at that RFI control station. For example, each reference GNSS signal receiver may be mounted atop an Rx antenna or other fixed structure at least a minimum height above ground (e.g., the minimum height corresponding to a minimum assured effective range of the LDAS and/or minimum assured size of the LDAS protection region), or mounted aboard tethered unmanned aerial vehicles hovering at a minimum height or greater at the surveyed location.

At a step 504, each signal receiver determines a GNSS-driven absolute position of each Rx antenna based on the received position and timing signals.

At a step 506, each signal receiver compares the determined absolute position of each Rx antenna with the true location of that Rx antenna to determine a probability of GNSS spoofer presence. For example, if one or more determined absolute positions of an Rx antenna deviate from the true location of the Rx antenna, and the deviations can be attributed to GNSS spoofing with sufficient confidence (as opposed to, e.g., measurement errors or other anomalies), the signal receivers may conclude that the probability of spoofer presence is nonzero. Otherwise, if all absolute positions of an Rx antenna are consistent with the true location, the signal receivers may conclude that the probability of spoofer presence is zero.

At a step 508, if the determined probability of potential GNSS spoofing or jamming is nonzero, the RFI control station notifies the LDAS master control station of the nonzero probability. For example, the probability of potential GNSS spoofing or jamming may be zero/nonzero, or may be determined to be one of a sequence of discrete or continuous probabilities between zero and one (e.g., deviations of determined absolute positions from true locations may be found, but may not be sufficiently attributable to GNSS spoofing to meet confidence bounds). In some embodiments, the notification includes additional pertinent information, e.g., the associated accuracy confidence bound, actual measurements taken by the signal receivers, and/or directional/distance information with respect to a detected spoofer transmission.

At a step 510, the LDAS master control station transmits a periodic LDAS update to any aircraft in its transmission range, whether or not said aircraft are within the LDAS protection region. For example, if one or more RFI control stations indicate a nonzero probability of potential GNSS spoofer or jammer presence within a predetermined time interval, the LDAS update may include details of the nonzero probability. If no nonzero probabilities are detected during the most recent transmission interval, the LDAS update may indicate the zero probability.

Figure 5B:
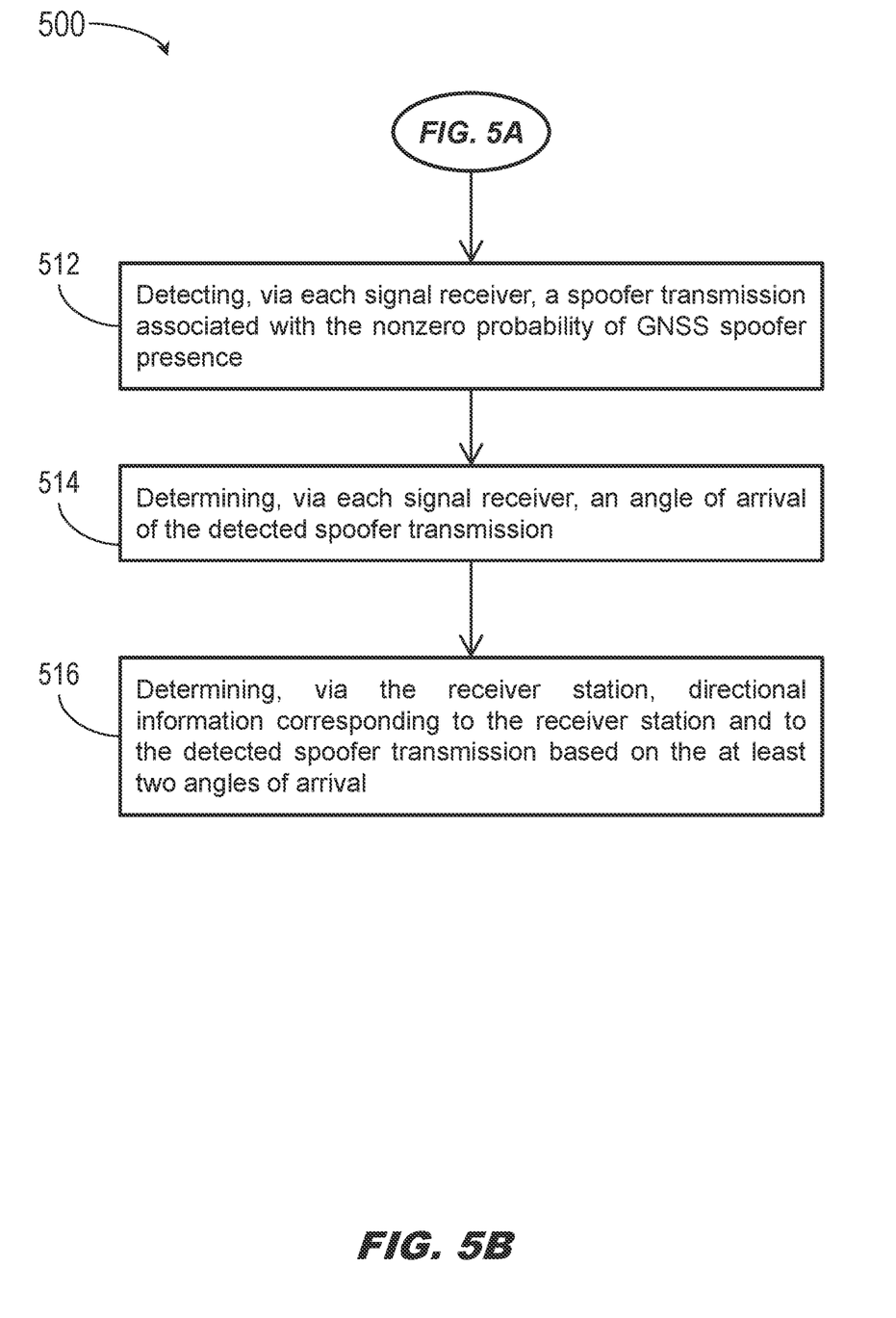

Referring also to FIG. 5B, the method 500 may include additional steps 512 through 516. At the step 512, if a nonzero probability of spoofer presence is determined at an RFI control station, the signal receivers of that RFI control station attempt to detect a spoofer transmission responsible for the GNSS measurement anomalies.

At a step 514, each signal receiver determines an angle of arrival of the detected spoofer transmission. For example, one or more signal receivers may correlate angle of arrival measurements and arrival times of the spoofer transmission at multiple Rx antennas with which the signal receiver is in communication.

At the step 516, the RFI control center (or the component signal receivers) determines directional and/or distance information between the RFI control center and a source of the spoofer transmission based on the correlated angles of arrival and arrival times at various component Rx antennas and the known spatial relationships between each true location. Directional and/or distance information may be shared with the master control center and/or included in VDB transmissions.

Figure 5C:
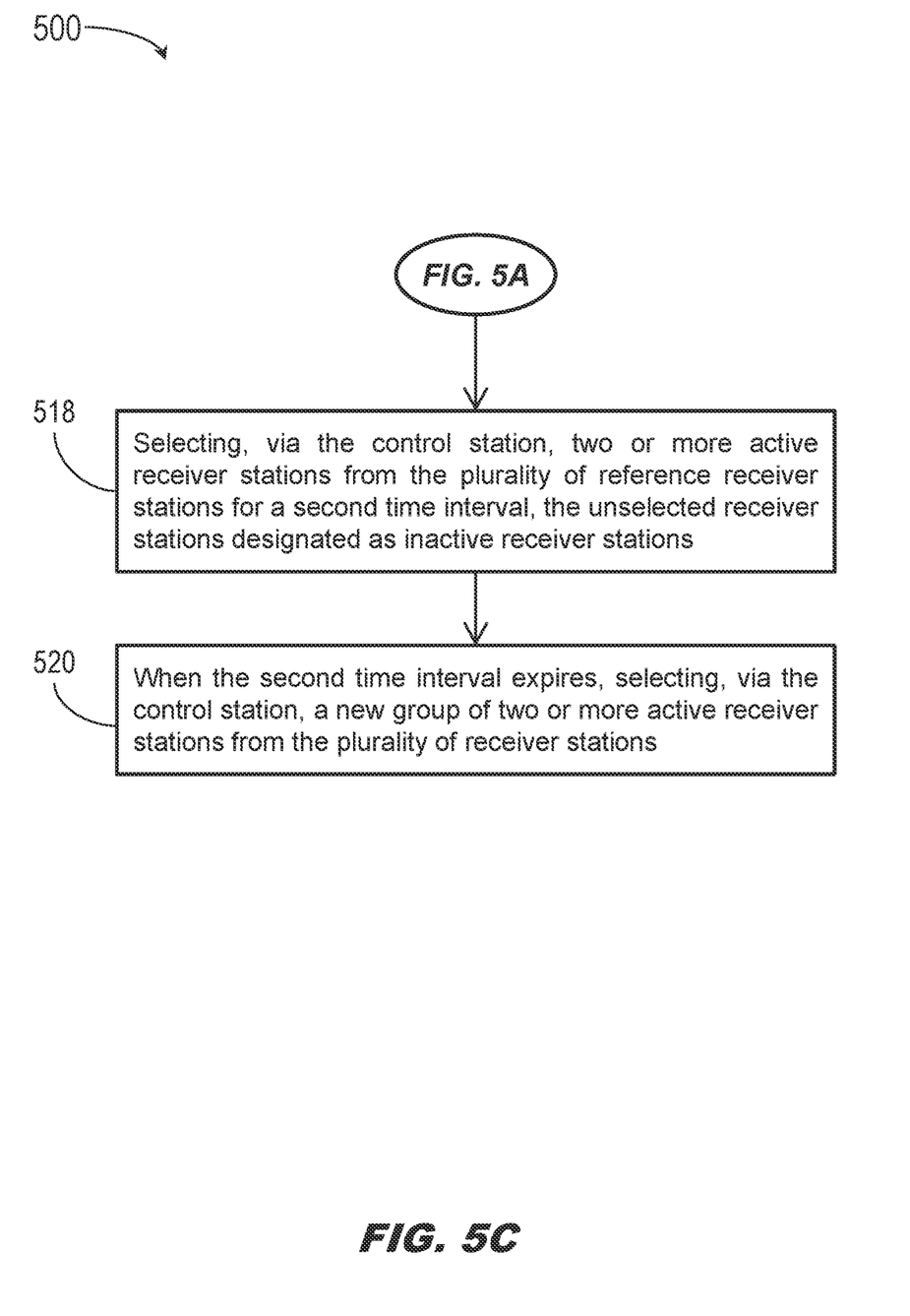

Referring also to FIG. 5C, the method 500 may include additional steps 518 and 520. At the step 518, the master control station selects active RFI control stations and/or signal receivers from the pool of RFI control stations and component signal receivers associated with the LDAS system. For example, active RFI control stations and/or signal receivers monitor and maintain the LDAS protection region while inactive receiver stations remain dormant for the selection period. In some embodiments, active RFI control stations may include partially active stations where some signal receivers participate in maintaining the LDAS protection region while other receivers remain inactive.

At the step 520, when the current selection period expires, the master control station selects a new set of active RFI control stations and/or signal receivers. For example, any selected set of active receiver stations may be placed so as to maintain at least the minimum effective range for the LDAS system, and any selected partially active RFI control station may maintain at least two active signal receivers.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A system for local area detection and alerting of global navigation satellite system (GNSS) spoofing (LDAS), the LDAS system comprising:
    at least one ground-based control station comprising:
        one or more control processors;
        a memory in communication with the one or more control processors;
        and
        at least one transmitter in communication with the one or more control processors, the transmitter configured for one or more VHF data broadcast (VDB) transmissions via a transmit (Tx) antenna disposed at a first target height above ground;
    and
    two or more receiver stations in communication with the ground-based control station and collectively defining a coverage volume of the LDAS system, each receiver station comprising:
        at least two signal receivers operatively coupled to at least two reception (Rx) antennas, each Rx antenna corresponding to a distinct height and to a true location;
        each signal receiver configured to:
        receive, via each Rx antenna, a plurality of positioning signals from a plurality of navigational satellites;
        determine, based on the plurality of positioning signals, an absolute position of each Rx antenna;
        determine a probability of global navigation satellite system (GNSS) spoofer presence by comparing the determined absolute position of each Rx antenna to the corresponding true location;
        and
        if the determined probability of GNSS spoofer presence is nonzero, notify the control station of the nonzero probability;
    wherein the control station is configured to transmit at a regular time interval, via the one or more VDB transmissions, either the nonzero probability or a zero probability of GNSS spoofer presence.

2. The LDAS system of claim 1, wherein:
    the control station is configured to transmit at the regular time interval, via the one or more VDB transmissions, the zero probability of GNSS spoofer presence if none of the two or more reference receiver stations have indicated a nonzero probability within the most recent time interval.

3. The LDAS system of claim 1, wherein:
    each receiver station is configured to indicate a nonzero probability of GNSS spoofer presence when:
        1) At least one determined absolute position of an Rx antenna of the receiver station deviates from the corresponding true location of the Rx antenna;
        and
        2) The deviation of the at least one absolute position from the true location is attributable to GNSS spoofing beyond a confidence bound.

4. The LDAS system of claim 3, wherein the one or more VDB transmissions include the confidence bound.

5. The LDAS system of claim 1, wherein at least one signal receiver is configured to:
    detect a spoofer transmission associated with the nonzero probability;
    determine an angle of arrival of the spoofer transmission relative to at least one Rx antenna;
    determine directional information relative to the receiver station and to the spoofer transmission based on the at least one angle of arrival;
    and
    forward the directional information to the ground-based control station.

6. The LDAS system of claim 5, wherein the one or more VDB transmissions include the directional information.

7. The LDAS system of claim 1, wherein the regular time interval is a first time interval, the two or more receiver stations are active receiver stations, and:
    the control station is configured to select the two or more active receiver stations from a group of three or more receiver stations for a second time interval, the non-selected receiver stations being inactive receiver stations;
    and
    wherein the control station is configured to select two or more new active receiver stations from the group when the second time interval expires.

8. The LDAS system of claim 1, wherein the two or more receiver stations include:
    at least one Rx antenna fixed to a tethered aerial vehicle configured for operation at a target altitude.

9. The LDAS system of claim 1, wherein the LDAS system and the coverage volume are associated with an airport.

10. The LDAS system of claim 9, wherein the ground-based control station is physically disposed within the airport.

11. A control station for local area detection and alerting of global navigation satellite system (GNSS) spoofing (LDAS), the LDAS control station comprising:
    at least one receiver/transmitter associated with a surveyed true location, a target altitude, and a coverage volume, each receiver/transmitter configured to:
        receive a plurality of GNSS positioning signals from a plurality of navigational satellites;
        determine, based on the plurality of GNSS positioning signals, an absolute position of the receiver/transmitter;
        compare the determined absolute position to the surveyed true location of the receiver/transmitter;
        if a deviation of the determined absolute position from the surveyed true location is attributable to GNSS spoofing beyond a confidence bound, indicate a nonzero probability of GNSS spoofer presence within the coverage volume;
        and
        transmit at a regular time interval at least one LDAS update, each LDAS update indicative of:
        a zero probability of GNSS spoofer presence within the coverage volume;
        or
        if the nonzero probability has been indicated since the last LDAS update, the nonzero probability.

12. The LDAS control station of claim 11, wherein the at least one receiver/transmitter is attached to an antenna extending above ground level.

13. The LDAS control station of claim 11, wherein the at least one receiver/transmitter is attached to an unmanned aerial vehicle configured for operations at a target altitude.

14. The LDAS control station of claim 11, wherein the LDAS control station is a first control station of a network of two or more LDAS control stations, the LDAS update is a first LDAS update, and wherein the at least one receiver/transmitter is configured to:
  transmit the at least one first LDAS update to at least one second LDAS control station of the network;
  and
  receive at least one second LDAS update from the at least one second LDAS control station.

15. A method for local area detection and alerting of global navigation satellite system (GNSS) spoofing (LDAS), the method comprising:
  receiving, via at least two signal receivers associated with an LDAS receiver station, each signal receiver communicatively coupled to at least two receiver (Rx) antennas, each Rx antenna corresponding to a surveyed true location and to a distinct height, a plurality of GNSS positioning signals transmitted by a plurality of navigational satellites;
  determining, via each signal receiver and based on the one or more received positioning signals, an absolute position of each Rx antenna;
  determining, via each signal receiver, a probability of GNSS spoofer presence by comparing the determined absolute position of each Rx antenna to the corresponding surveyed true location;
  if the probability determined by at least one signal receiver is nonzero, notifying, via the receiver station, the control station of the nonzero probability;
  and
  transmitting, via the control station, at least one VHF data broadcast (VDB) transmission at a regular time interval, the at least one VDB transmission comprising one of:
    a zero probability of GNSS spoofer presence;
    or
    if at least one receiver station of the plurality of receiver stations has notified the control station of the nonzero probability within the most recent time interval, the nonzero probability of GNSS spoofer presence.

16. The method of claim 15, wherein determining, via each signal receiver, a probability of GNSS spoofer presence by comparing the determined absolute position of each Rx antenna to the corresponding surveyed true location includes:
  determining a nonzero probability of GNSS spoofer presence when:
    1) At least one determined absolute position of an Rx antenna deviates from the corresponding surveyed true location of the Rx antenna;
    and
    2) The deviation of the at least one determined absolute position is attributable to GNSS spoofing beyond a confidence bound.

17. The method of claim 16, wherein transmitting, via the control station, at least one VHF data broadcast (VDB) transmission at a regular time interval, includes transmitting the confidence bound.

18. The method of claim 15, further comprising:
  detecting, via each signal receiver, a spoofer transmission associated with the nonzero probability of GNSS spoofer presence;
  determining, via each signal receiver, an angle of arrival of the detected spoofer transmission;
  and
  determining, via the receiver station, directional information corresponding to the receiver station and to the detected spoofer transmission based on the at least two angles of arrival.

19. The method of claim 18, wherein transmitting, via the control station, at least one VHF data broadcast (VDB) transmission at a regular time interval includes transmitting the directional information.

20. The method of claim 15, wherein the receiver station is an active receiver station and the regular time interval is a first time interval, further comprising:
  selecting, via the control station, two or more active receiver stations from the plurality of receiver stations for a second time interval, the unselected receiver stations designated as inactive receiver stations;
  and
  when the second time interval expires, selecting, via the control station, a new group of two or more active receiver stations from the plurality of receiver stations.

* * * * *